US008641784B2

(12) United States Patent
Meyer et al.

(10) Patent No.: US 8,641,784 B2
(45) Date of Patent: Feb. 4, 2014

(54) ORGANIC COLOURING AGENTS AND COLOURED POLYMER COMPOSITIONS WITH A HIGH STABILITY TO WEATHERING

(75) Inventors: Alexander Meyer, Düsseldorf (DE); Michael Wagner, Moers (DE); Joerg Reichenauer, Krefeld (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 13/326,438

(22) Filed: Dec. 15, 2011

(65) Prior Publication Data

US 2012/0152150 A1 Jun. 21, 2012

(30) Foreign Application Priority Data

Dec. 17, 2010 (IT) ............... RM2010A0670

(51) Int. Cl.
*B60P 1/00* (2006.01)
*D06P 1/24* (2006.01)
*D06P 3/00* (2006.01)

(52) U.S. Cl.
USPC ............. 8/506; 8/636; 8/638; 8/675; 8/685; 8/686; 8/688; 296/84.1

(58) Field of Classification Search
USPC ............ 8/636, 638, 689, 506, 626, 628, 675, 8/685, 686; 296/84.1
See application file for complete search history.

(56) References Cited

U.S. PATENT DOCUMENTS

| 2,889,327 A | 6/1959 | Howard |
| 2,991,273 A | 7/1961 | Hechelhammer et al. |
| 2,999,825 A | 9/1961 | Floyd et al. |
| 2,999,846 A | 9/1961 | Schnell et al. |
| 3,028,635 A | 4/1962 | Herubel |
| 3,148,172 A | 9/1964 | Fox |
| 3,271,367 A | 9/1966 | Schnell et al. |
| 3,299,065 A | 1/1967 | Dien |
| 3,728,124 A | 4/1973 | Whyte |
| 3,846,369 A | 11/1974 | Whyte |
| 4,035,958 A | 7/1977 | Nishio |
| 4,101,513 A | 7/1978 | Fox et al. |
| 4,185,009 A | 1/1980 | Idel et al. |
| 4,395,463 A | 7/1983 | Kray |
| 4,707,393 A | 11/1987 | Vetter |
| 4,894,972 A | 1/1990 | Endoh et al. |
| 4,982,014 A | 1/1991 | Freitag et al. |
| 5,041,313 A | 8/1991 | Patel |
| 5,116,706 A | 5/1992 | Kojima et al. |
| 5,235,026 A | 8/1993 | Wulff et al. |
| 5,239,406 A * | 8/1993 | Lynam ............ 359/275 |
| 5,288,778 A | 2/1994 | Schmitter et al. |
| 5,349,040 A | 9/1994 | Trinks et al. |
| 5,367,044 A | 11/1994 | Rosenquist |
| 5,391,795 A | 2/1995 | Pickett |
| 5,530,130 A | 6/1996 | Roschger et al. |
| 5,574,078 A * | 11/1996 | Elwakil .......... 523/161 |
| 5,627,256 A | 5/1997 | Meier et al. |
| 5,821,380 A | 10/1998 | Holderbaum et al. |
| 5,846,659 A | 12/1998 | Lower et al. |
| 5,869,185 A | 2/1999 | Bahr et al. |
| 5,883,165 A | 3/1999 | Krohnke et al. |
| 5,952,096 A | 9/1999 | Yamashita et al. |
| 6,228,973 B1 | 5/2001 | McCloskey et al. |
| 6,350,512 B1 | 2/2002 | Hurley et al. |
| 6,355,723 B1 | 3/2002 | van Baal et al. |
| 6,476,158 B1 | 11/2002 | England et al. |
| 6,613,869 B1 | 9/2003 | Horn et al. |
| 6,860,539 B2 | 3/2005 | Watanabe et al. |
| 7,230,113 B2 | 6/2007 | Chauhan et al. |
| 7,550,193 B2 | 6/2009 | Hu et al. |
| 7,645,884 B2 | 1/2010 | Chauhan et al. |
| 7,728,056 B2 | 6/2010 | Kuvshinnikova et al. |
| 2002/0120092 A1 | 8/2002 | Kratschmer et al. |
| 2003/0094600 A1 | 5/2003 | Dobler et al. |
| 2003/0122114 A1 | 7/2003 | Dobler et al. |
| 2004/0131845 A1 | 7/2004 | Fujita |
| 2004/0164446 A1 | 8/2004 | Goossens et al. |
| 2005/0119377 A1 | 6/2005 | Ishii et al. |
| 2005/0161642 A1 | 7/2005 | Takeda |

(Continued)

FOREIGN PATENT DOCUMENTS

| CA | 1064191 A | 10/1979 |
| DE | 995268 | 1/1957 |

(Continued)

OTHER PUBLICATIONS

Translation DE 2148101, 2013.*
U.S. Appl. No. 13/326,459.
U.S. Appl. No. 13/326,480.
U.S. Appl. No. 13/326,419.
International Search Report and Written Opinion for PCT/EP2011/072909 dated Jan. 18, 2012.
International Search Report and Written Opinion for PCT/EP2011/072913, dated Feb. 6, 2012.

(Continued)

*Primary Examiner* — Lorna M Douyon
*Assistant Examiner* — Amina Khan
(74) *Attorney, Agent, or Firm* — Novak Druce Connolly Bove + Quigg LLP

(57) ABSTRACT

The present invention relates to organic coloring agents with a high color stability to weathering for thermoplastics. The invention furthermore relates to a polymer composition containing at least one thermoplastic and at least one organic coloring agent, preferably a combination of at least two organic coloring agents, of a specific structure. The invention moreover relates to the use of the coloring agents according to the invention for coloring polymer compositions, in particular for transparent formulations such as are required for the production of panes for use in buildings, motor vehicles and track vehicles or aircraft.

11 Claims, No Drawings

(56) References Cited

U.S. PATENT DOCUMENTS

| | | |
|---|---|---|
| 2005/0250915 A1 | 11/2005 | Heuer et al. |
| 2006/0105053 A1 | 5/2006 | Marx et al. |
| 2006/0178254 A1 | 8/2006 | Takeda et al. |
| 2006/0234061 A1 | 10/2006 | Buckel et al. |
| 2007/0015081 A1 | 1/2007 | van den Bogerd et al. |
| 2007/0210287 A1 | 9/2007 | Guerra |
| 2008/0081896 A1 | 4/2008 | Heuer |
| 2008/0103267 A1* | 5/2008 | Hurst et al. ................... 525/464 |
| 2008/0132618 A1 | 6/2008 | Eckel et al. |
| 2008/0258338 A1 | 10/2008 | Seidel et al. |
| 2009/0062424 A1 | 3/2009 | Hein |
| 2009/0136730 A1 | 5/2009 | Nakano et al. |
| 2009/0258978 A1 | 10/2009 | Ruediger et al. |
| 2010/0242792 A1* | 9/2010 | Loebel ..................... 106/31.47 |
| 2011/0293921 A1 | 12/2011 | Meyer et al. |
| 2012/0021152 A1 | 1/2012 | Glaser et al. |

FOREIGN PATENT DOCUMENTS

| | | |
|---|---|---|
| DE | 10 31 512 B | 6/1958 |
| DE | 1570703 A1 | 2/1970 |
| DE | 1569613 A1 | 6/1970 |
| DE | 2148101 * | 9/1971 |
| DE | 2036052 A1 | 1/1972 |
| DE | 2 063 050 A1 | 7/1972 |
| DE | 2148101 A1 | 4/1973 |
| DE | 2211956 A1 | 10/1973 |
| DE | 2407674 A1 | 10/1974 |
| DE | 25 00 092 A1 | 7/1976 |
| DE | 2804283 A1 | 8/1978 |
| DE | 3121385 A1 | 8/1982 |
| DE | 3742881 A1 | 7/1988 |
| DE | 3832396 A1 | 2/1990 |
| DE | 42 40 313 A | 6/1994 |
| DE | 19636032 A1 | 3/1998 |
| DE | 19 943 642 A1 | 3/2001 |
| DE | 10006208 A1 | 8/2001 |
| DE | 10022037 A1 | 11/2001 |
| DE | 10311063 A1 | 9/2004 |
| DE | 10392543 T5 | 4/2005 |
| DE | 102006055479 A1 | 5/2008 |
| DE | 102007011069 A1 | 9/2008 |
| EP | 0 110 238 A2 | 6/1984 |
| EP | 0110221 A2 | 6/1984 |
| EP | 0 481 319 A2 | 4/1992 |
| EP | 0 500 496 A1 | 8/1992 |
| EP | 0517044 A2 | 12/1992 |
| EP | 0 570 165 A2 | 11/1993 |
| EP | 0639624 A1 | 2/1995 |
| EP | 0 716 919 A2 | 6/1996 |
| EP | 0718354 A2 | 6/1996 |
| EP | 0839623 A1 | 5/1998 |
| EP | 1308084 A1 | 5/2003 |
| EP | 1506249 A1 | 2/2005 |
| EP | 1559743 A1 | 8/2005 |
| EP | 1582549 A1 | 10/2005 |
| EP | 1624012 A1 | 2/2006 |
| EP | 1865027 A1 | 12/2007 |
| EP | 2009057 A1 | 12/2008 |
| FR | 1561518 A | 3/1969 |
| GB | 1122003 A | 7/1968 |
| GB | 1229482 A | 4/1971 |
| GB | 1341318 A | 12/1973 |
| GB | 1367790 A | 9/1974 |
| JP | 61-062039 | 3/1986 |
| JP | 61-062040 | 3/1986 |
| JP | 61-105550 | 5/1986 |
| JP | 4328154 | * 11/1992 |
| JP | 4328154 A | 11/1992 |
| JP | 07033969 A | 2/1995 |
| JP | 2003-277045 A | 10/2003 |
| JP | 2005-047179 A | 2/2005 |
| JP | 2005344006 A | 12/2005 |
| JP | 2006249345 A | 9/2006 |
| JP | 2006-307172 A | 11/2006 |
| JP | 2007-169503 A | 7/2007 |
| JP | 2008-156386 A | 7/2008 |
| JP | 2008-214596 A | 9/2008 |
| WO | WO-96/15102 A2 | 5/1996 |
| WO | WO-0226862 A1 | 4/2002 |
| WO | WO-03/074584 A1 | 9/2003 |
| WO | WO-2005030851 A1 | 4/2005 |
| WO | WO-2005037932 A1 | 4/2005 |
| WO | WO-2005113639 A1 | 12/2005 |
| WO | WO-2006/108520 A1 | 10/2006 |
| WO | WO-2007/008476 A2 | 1/2007 |
| WO | WO-2007/067462 A1 | 6/2007 |
| WO | WO-2007/130607 A1 | 11/2007 |
| WO | WO-2008037364 A1 | 4/2008 |
| WO | WO-2008/071363 A2 | 6/2008 |
| WO | WO-2008/109072 A1 | 9/2008 |
| WO | WO-2008122359 A1 | 10/2008 |
| WO | WO-2008/134517 A1 | 11/2008 |
| WO | WO-2009/064860 A1 | 5/2009 |
| WO | WO-2009 074504 A2 | 6/2009 |
| WO | WO-2010/092013 A1 | 8/2010 |
| WO | WO-2011/141369 A1 | 11/2011 |

OTHER PUBLICATIONS

International Search Report and Written Opinion for PCT/EP2011/072915, dated Jun. 14, 2012.
Italian Search Report dated Dec. 5, 2011.
International Search Report dated Jan. 20, 2012.

* cited by examiner

ORGANIC COLOURING AGENTS AND COLOURED POLYMER COMPOSITIONS WITH A HIGH STABILITY TO WEATHERING

CROSS REFERENCE TO RELATED APPLICATIONS

Priority is claimed to Italian Patent Application No. RM 2010A000670, filed Dec. 17, 2010 which is incorporated herein by reference, in its entirety, for all useful purposes.

BACKGROUND

Embodiments of the present invention relate to organic colouring agents with a high colour stability to weathering for thermoplastics.

Embodiments of the invention furthermore relate to a polymer composition containing at least one thermoplastic and at least one organic colouring agent, preferably a combination of at least two organic colouring agents, of a specific structure.

Embodiments of the invention furthermore relate to the use of the colouring agents according to the invention for colouring polymer compositions, in particular for transparent formulations such as are required for the production of panes for use in buildings, motor vehicles and track vehicles or aircraft.

Embodiments of the present invention moreover relate to a process for the preparation of thermoplastic polymer compositions containing the colouring agent according to the invention or the colouring agent combination according to the invention.

Embodiments of the present invention furthermore provides the products, shaped articles or shaped objects produced from the thermoplastic polymer compositions coloured according to the invention.

The colouring of plastics is known per se.

Nevertheless, there has hitherto been a lack of colouring agent combinations, in particular for transparent formulations, which render possible a neutral colour formulation—e.g. a grey colour—and have an excellent stability to weathering for uses with high optical requirements. Uses with correspondingly high requirements of the colouring agent combinations used include, inter alia, transparent ready-made parts for automobile glazing which can be coloured to a varying degree depending on the use. Because of the long life of motor vehicles, in this context it is important in particular in the field of expensive automobiles for the desired high quality colour impression of the material to be retained without noticeable losses over the period of the useful life.

Glazing produced from compositions containing transparent thermoplastic polymers, such as e.g. polycarbonate, offers many advantages over conventional glazing of glass for use in the vehicle sector and for buildings. These include e.g. increased fracture-proof properties and/or saving in weight, which in the case of automobile glazing renders possible a higher safety of passengers in the event of traffic accidents and a lower fuel consumption. Finally, transparent materials which contain transparent thermoplastic polymers allow a considerably greater freedom of design due to the simpler formability.

Panes which are employed in the motor vehicle, track vehicle and aircraft or in the infrastructure sector must furthermore have a long life and should not become brittle during this life. The colour and transparency should moreover not change or change only slightly over the life, as is the case also for the IR protection properties with an appropriate IR protection finish of the panes, i.e. protection from thermal radiation. The pane must furthermore have an adequate scratch resistance.

Because of the long life required, glass is often employed as the glazing material. Glass is insensitive to UV radiation, has a low susceptibility to scratching and does not change its mechanical properties over long periods of time. Since inorganic oxides, such as e.g. iron oxide, are employed as pigments and IR absorbers, the IR and colour properties also remain practically unchanged over long periods of time. Nevertheless, the use of these pigments in thermoplastic materials is not possible, since it leads to clouding and/or degradation of the corresponding matrix.

On the basis of the advantages described above for plastics, there is therefore the need for materials which have both the good physical properties of thermoplastics and the high colour stability of correspondingly coloured glasses.

Among the transparent thermoplastics, polymers based on polycarbonate and polymethyl methacrylate (PMMA), for example, are particularly suitable for use as glazing material. Due to the high toughness, polycarbonate in particular has a very good profile of properties for such intended uses.

In order to improve the longevity of thermoplastic materials, it is known to provide these with UV protection and/or scratch-resistant coatings. A large number of colouring agents which have a high fastness to light are moreover known.

It has been found, nevertheless, that the thermoplastic compositions mentioned in the prior art are only inadequately suitable if an exceptionally high colour stability is required. This is the case e.g. if glass panes and transparently coloured panes of thermoplastic material are used together in construction. It is found here that the colour stability of glass is superior to that of the thermoplastic material. Colour deviations are striking in particular if these materials are used side by side in construction.

Bleaching out of colouring agents not only leads to the change in the colour properties, but also leads to a higher energy transmission occurring, since about 50% of the energy transmitted through a pane originates from the visual range of the solar spectrum. The latter is undesirable especially in the field of automobile and building glazing, since the particular inside temperature is thereby influenced.

It may furthermore be necessary to configure the colouring of the shaped article in a neutral colour, since the atmosphere of the interior or of the interior furnishings is influenced by an intensely coloured pane. As a rule, a grey of neutral colour is preferred. In certain embodiments, the colouring can be changed towards a blue-grey, a green-grey, red-grey or yellow-grey.

The composition must be processable under the conventional temperatures for thermoplastics, without the colour or other optical properties changing significantly during processing.

Many dyestuffs have been described as particularly fast to light and therefore also as stable in the prior art. The fastness to light (determined at ⅓ standard depth with 1% $TiO_2$ (for Polystyrol 2% $TiO_2$ in accordance with DIN EN ISO 4892-2; transparent dyeings with 0.05% of dyestuff; evaluated according to an 8-level blue scale) of the so-called Macrolex dyestuffs (Lanxess Data Sheets, Technical Information, Lanxess Deutschland GmbH, Functional Chemicals, High Performance Additives, Colorants, 51369 Leverkusen, Germany), such as e.g. the dyestuffs Macrolex® Blue RR (Solvent Blue 97), Macrolex® Violet 3R (Solvent Violet 36), which are envisaged for use in polycarbonate, has been classified with 7-8 (8=maximum value). Nevertheless, it was found in the context of the present experiments that colouring agents formally classified as fast to light do not have the stability according to the invention during weathering in polycarbonate compositions.

Rather, it has been found that only a very small number of colouring agents of a specific structure are suitable. In particular, specific combinations are suitable for achieving the present object.

There was therefore the object of providing colouring agents or a colouring agent combination with a high colour stability to weathering for thermoplastic polymers. In this context, the visual colour impression of the coloured thermoplastic polymer composition should change only slightly over life.

It was moreover an object of the present invention here to meet the following prerequisites in the case of transparently coloured thermoplastic polymer compositions:

The change in the colour values ΔE after 3,000 h of artificial weathering with exposure to xenon light at 0.75 W should be less than 5.0, preferably less than 4.0, particularly preferably less than 3.0. Furthermore, the visual colour impression, which means in particular streaks and points of high colour concentrations, also should not change.

In a particular embodiment, a neutral grey colour with colour values of a*=0±5 and b*=0+5, in particular a*=0±4 and b*=0÷4 is preferred.

In the context of the present invention, transparency is understood as meaning that the background when viewed through the transparent material, e.g. in the form of a corresponding shaped article, can be clearly detected. Mere transparency to light, such as e.g. in the case of frosted glass, through which the background appears only blurred, is not sufficient to describe the corresponding material as transparent. Transparent thermoplastic polymers or the thermoplastic polymer compositions in the context of the present invention furthermore have an initial clouding before weathering of less than 5.0%, preferably 4.0%, more preferably less than 3.0%, particularly preferably less than 2.0%.

A further object of the present invention was to provide a process for the preparation of thermoplastic polymer compositions containing the organic colouring agents according to the invention or the organic colouring agent combination.

It was furthermore the object of the present invention to provide coloured thermoplastic polymer compositions containing at least one organic colouring agent or one organic colouring agent combination for the production of multilayer articles, mouldings and ready-made parts.

Surprisingly, it has been possible to achieve objects of the invention by the organic colouring agents according to the invention or the organic colouring agent combinations according to the invention and the thermoplastic polymer compositions according to the invention prepared using the organic colouring agents according to the invention or the organic colouring agent combinations according to the invention.

BRIEF DESCRIPTION OF PREFERRED EMBODIMENTS

An embodiment of the present invention provides a colouring agent composition comprising a colouring agent or a colouring agent combination of the structures selected from the group consisting of:

I. (1a) and/or (1b), (4), (2a) and/or (2b)
II. (1a) and/or (1b), (5), (2a) and/or (2b)
III. (1a) and/or (1b), (7)
IV. (1a) and/or (1b), (4), (7)
V. (1a) and/or (1b), (5), (7)
VI. (4), (2a) and/or (2b)
VII. (5), (2a) and/or (2b)
VIII. (2a) and/or (2b), (4), (6)
IX. (2a) and/or (2b), (5), (6)
X. (3), (4)
XI. (3), (5)
XII. (3), (4), (6)
XIII. (3), (5), (6)
XIV. (3), (4), (7)
XV. (3), (5), (7)
XVI. (3), (4), (2a) and/or (2b)
XVII. (3), (5), (2a) and/or (2b)
XVIII. (6), (1a) and/or (1b)
XIX. (6), (1a) and/or (1b), (7)
XX. (1a) and/or (1b), (8)
XXI. (7), (4)
XXII. (7), (5)
XXIII. (1a) and/or (1b),
XXIV. (2a) and/or (2b),
XXV. (7)
XXVI. (2a) and/or (2b), (7).
wherein the structures are as follows:

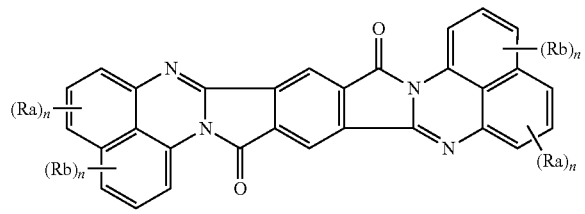

(1a)

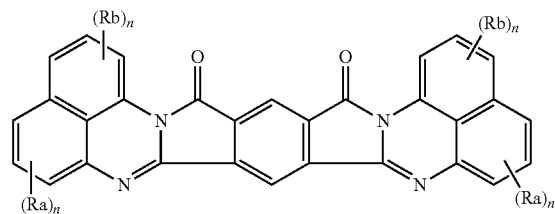

(1b)

wherein
Ra and Rb, independently of one another, represent a linear or branched alkyl radical, or halogen;
n, independently of the particular R, represents a natural number between 0 and 3, wherein for n=0 the radical is hydrogen;

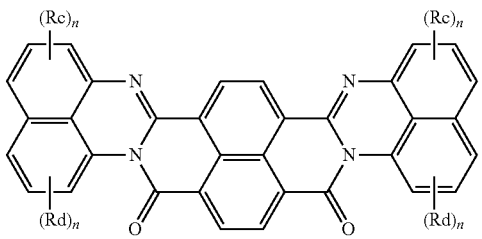

(2a)

(2b)

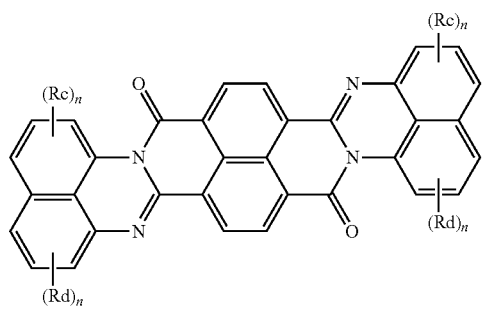

wherein
Rc and Rd, independently of one another, represent a linear or branched alkyl radical, or halogen;
n, independently of the particular R, represents a natural number between 0 and 3, wherein for n=0 the radical is hydrogen;

(3)

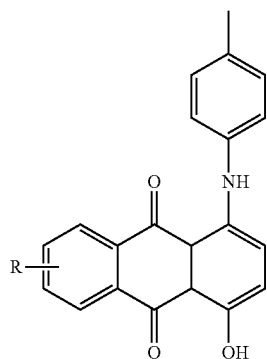

wherein
R is selected from the group consisting of H and the p-methylphenylamine radical;

(4)

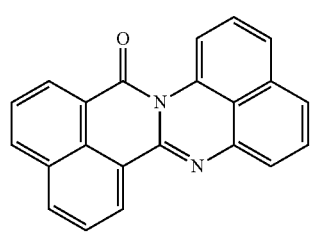

wherein
R3 is a halogen;
n=4;

(5)

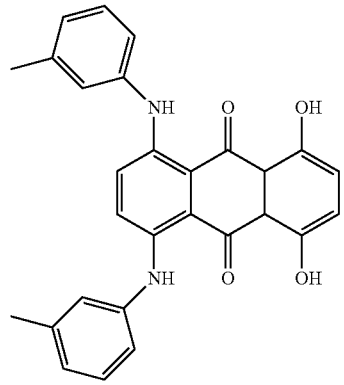

(6)

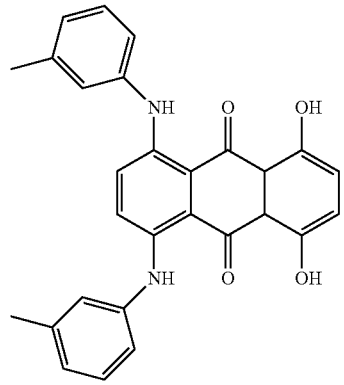

(7)

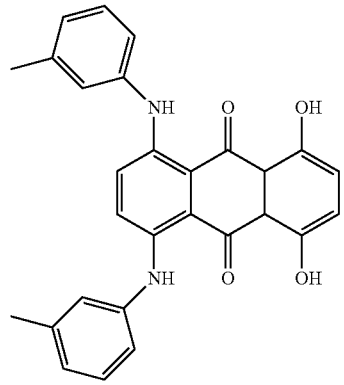

wherein
R1 and R2, independently of one another, represent a linear or branched alkyl radical, or halogen;
n represents a natural number between 0 and 4;

(8a)

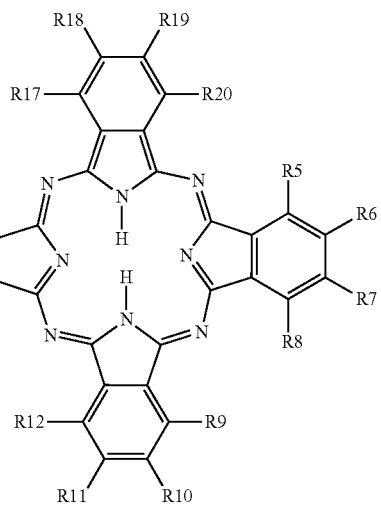

-continued (8b)

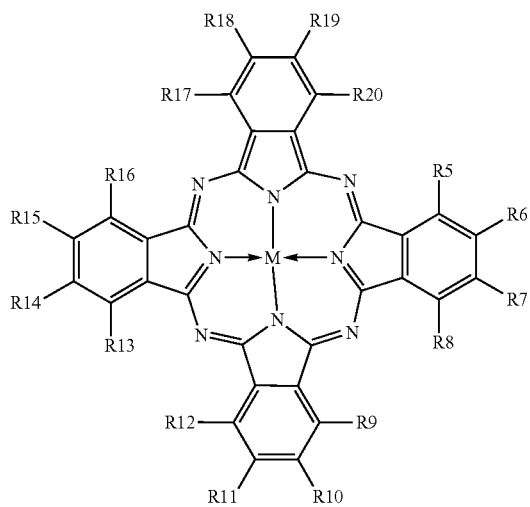

wherein
the radicals R(5-20), independently of one another, represent hydrogen, methyl, ethyl, propyl, isopropyl, butyl, isobutyl, tert-butyl, pentyl, neopentyl, hexyl, thexyl, fluorine, chlorine, bromine, sulfone or CN, and
M, represents aluminium, nickel, cobalt, iron, zinc, copper or manganese.

Another embodiment of the present invention is the above composition, wherein the composition comprises at least one colouring agent of the structures (1a), (1b), (2a), (2b) or (7).

Another embodiment of the present invention is the above composition, wherein the colouring agent of the structure (7) has a bulk volume of 2 /lkg to 10 /lkg, a specific surface area of 5 $m^2/g$ to 60 $m^2/g$ and a pH of from 4 to 9.

Another embodiment of the present invention is the above composition, wherein the composition comprises the colouring agents of the structures (1a) and (1b) and/or (2a) and (2b) in a 1:1 isomer mixture.

Another embodiment of the present invention is the above composition, wherein the composition comprises the colouring agents of the structures (1a) and (1b) and/or (2a) and (2b) in each case only as a pure isomer.

Another embodiment of the present invention is the above composition, wherein the composition comprises at least one colouring agent chosen from the structures 1 to 3 and at least one colouring agent chosen from the structures 4 to 8.

Another embodiment of the present invention is the above composition, wherein the colouring agents of structures 1 to 3 are present in a ratio to the colouring agents of structures 4 to 8 of from 1:3 to 3:1.

Yet another embodiment of the invention is a process for preparing a weathering-stable, transparent, thermoplastic polymer composition which comprises using the above colouring agent composition.

Yet another embodiment of the invention is a transparent thermoplastic polymer composition comprising the above colouring agent composition.

Another embodiment of the invention is the above polymer composition, wherein components a) and b) are used in the thermoplastic polymer composition in amounts, based on the particular individual components, of from 0.000001 wt. % to 1 wt. %, based on the total polymer composition.

Another embodiment of the invention is the above polymer composition, wherein the thermoplastic comprises a polycarbonate.

Another embodiment of the invention is the above polymer composition, wherein the polymer composition further comprises an inorganic or organic IR absorbers, UV absorbers and/or carbon black.

Yet another embodiment of the invention is a vehicle pane comprising the above colouring agent composition.

Another embodiment of the invention is the above vehicle pane, wherein the vehicle pain comprises a scratch-resistant coating which comprises UV absorbers.

Another embodiment of the invention is the above vehicle pane, wherein the vehicle pane is a polycarbonate pane and the change in the colour value E after 3,000 h of artificial weathering with exposure to xenon light at 0.75 W is less than 5.0.

DETAILED DESCRIPTION OF PREFERRED EMBODIMENTS

As used herein, the singular terms "a" and "the" are synonymous and used interchangeably with "one or more" and "at least one," unless the language and/or context cleary indicates otherwise. Accordingly, for example, reference to "a colouring agent" herein or in the appended claims can refer to a single colouring agent or more than one colouring agent. Additionally, all numerical values, unless otherwise specifically noted, are understood to be modified by the word "about."

Colouring agents or colouring agent combinations according to the invention are the following colouring agents or combinations (commas are to be read as "and"):

(1a) and/or (1b), (4), (2a) and/or (2b)

II. (1a) and/or (1b), (5), (2a) and/or (2b)

III. (1a) and/or (1b), (7)

IV. (1a) and/or (1b), (4), (7)

V. (1a) and/or (1b), (5), (7)

VI. (4), (2a) and/or (2b)

VII. (5), (2a) and/or (2b)

VIII. (2a) and/or (2b), (4), (6)

IX. (2a) and/or (2b), (5), (6)

X. (3), (4)

XI. (3), (5)

XII. (3), (4), (6)

XIII. (3), (5), (6)

XIV. (3), (4), (7)

XV. (3), (5), (7)

XVI. (3), (4), (2a) and/or (2b)

XVII. (3), (5), (2a) and/or (2b)

XVIII. (6), (1a) and/or (1b)

XIX. (6), (1a) and/or (1b), (7)

XX. (1a) and/or (1b), (8)

XXI. (7), (4)

XXII. (7), (5)

XXIII. (1a) and/or (1b),

XXIV. (2a) and/or (2b),

XXV. (7)

XXVI. (2a) and/or (2b), (7), wherein the abovementioned structures are defined as follows:

a)

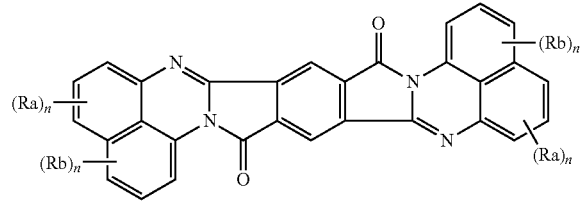
(1a)

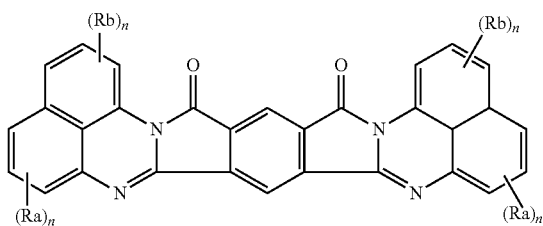
(1b)

wherein

Ra and Rb independently of each other represent a linear or branched alkyl radical, or halogen, preferably represent methyl, ethyl, propyl, isopropyl, butyl, isobutyl, tert-butyl, pentyl, neopentyl, hexyl, thexyl, or Cl, more preferably methyl, Cl and particularly preferably Cl.

n independently of the particular R represents a natural number between 0 and 3, where for n=0 the radical is hydrogen.

In a preferred embodiment, Ra and/or Rb are Cl and are in the o and/or p positions relative to the carbon atoms which carry the amine functionalities, such as e.g. di-orthochloronaphthaleno, di-ortho, mono-para-chloronaphthaleno, and mono-ortho-naphthaleno. Furthermore, in a preferred embodiment Ra and Rb each represent a tert-butyl radical, which is preferably in the meta position relative to the carbon atoms which carry the nitrogen functionalities.

In a particularly preferred embodiment, n=0 in all the rings, so that all the Ra and Rb=H.

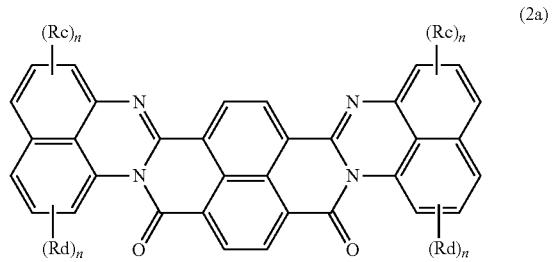
(2a)

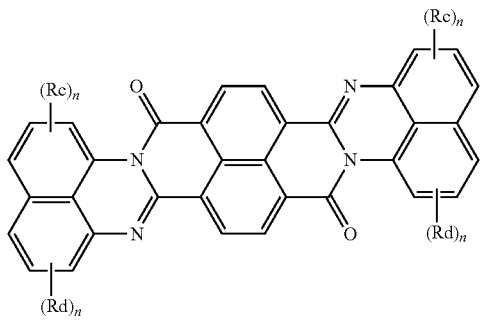
(2b)

wherein

Rc and Rd independently of each other represent a linear or branched alkyl radical, or halogen, preferably represent methyl, ethyl, propyl, isopropyl, butyl, isobutyl, tert-butyl, pentyl, neopentyl, hexyl, thexyl, or Cl, more preferably methyl, Cl and particularly preferably Cl.

n independently of the particular R represents a natural number between 0 and 3, where for n=0 the radical is hydrogen.

In a preferred embodiment, Rc and/or Rd are Cl and are in the o and/or p positions relative to the carbon atoms which carry the amine functionalities, such as e.g. di-orthochloronaphthaleno, di-ortho, mono-para-chloronaphthaleno, and mono-ortho-naphthaleno. Furthermore, in a preferred embodiment Rc and Rd each represent a tert-butyl radical, which is preferably in the meta position relative to the carbon atoms which carry the nitrogen functionalities.

In a particularly preferred embodiment, n=0 in all the rings, so that all the Rc and Rd=H.

The structures (1a) and (1b), and (2a) and (2b) behave as isomers with respect to one another. The particular isomers can be employed by themselves or in a mixture. In a particular embodiment, a 1:1 isomer mixture (based on the particular amount of the isomer in the isomer mixture in wt. %) of (1a) and (1b), or (2a) and (2b) is employed.

The preparation of such colouring agents has been described e.g. in DE 2148101 or WO 2009 074504 A1.

Preferably, the composition according to the invention contains at least one colouring agent of the structures (1a), (1b), (2a) and (2b), of these the colouring agents of the structures (1a) and (1b) being particularly preferred.

In a further embodiment, the structures (1a), (1b), (2a) and (2b) are employed as in each case pure isomers, it being possible for the pure isomers to be obtained, for example, by preparative HPLC.

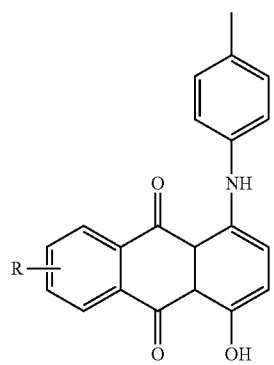
(3)

R is chosen from the group which consists of H and the p-methylphenylamine radical; preferably, R=H.

Such colouring agents are obtainable e.g. from Lanxess AG under the trade name Macrolex® Violet B. In a particular embodiment, no colouring agent of the structure (3) is employed.

and b)

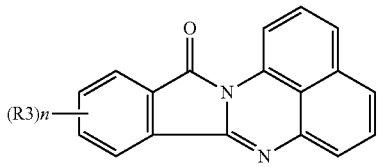
(4)

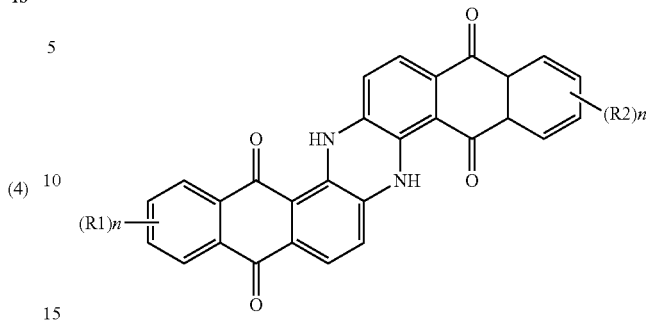
(7)

wherein R3 preferably represents halogen, and particularly preferably Cl, wherein particularly preferably n=4. An embodiment where n=0, so that R3=H, is more preferred.

Such colouring agents are obtainable e.g. from Lanxess AG under Macrolex® Orange 3G or Macrolex® Red EG.

In this context, if R3 represents Cl and n=4, instead of the colouring agent of the structure (4) the colouring agent with the structure (5) can be employed in order to achieve the same colour properties:

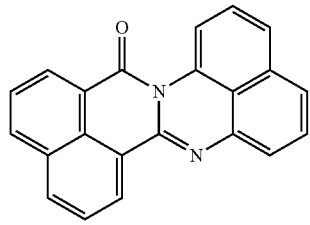
(5)

Such colouring agents are obtainable e.g. from Lanxess AG under the trade name Macrolex® Red E2G.

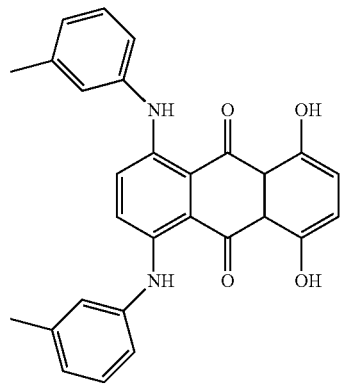
(6)

Such colouring agents are obtainable e.g. from Lanxess AG under the trade name Macrolex® Green G.

wherein

R1 and R2 independently of each other represent a linear or branched alkyl radical, or halogen, preferably represent methyl, ethyl, propyl, isopropyl, butyl, isobutyl, tert-butyl, pentyl, neopentyl, hexyl, thexyl, or Cl, more preferably methyl, Cl and particularly preferably Cl.

n represents a natural number between 0 and 4.

In a particularly preferred embodiment, n=0 in all the rings, so that all the R1 and R2=H.

Colouring agents of this structure (7) are commercially obtainable under the Paliogen Blue series of BASF AG.

If colouring agents of the structure (7) are used, the pigments which have a bulk volume (determined in accordance with DIN ISO 787-11) of 2 l/kg-10 l/kg, preferably 3 l/kg-8 l/kg, a specific surface area (determined in accordance with DIN 66132) of 5 m²/g-60 m²/g, preferably 10 m²/g-55 m²/g, and a pH (determined in accordance with DIN ISO 787-9) of 4-9 are particularly preferred.

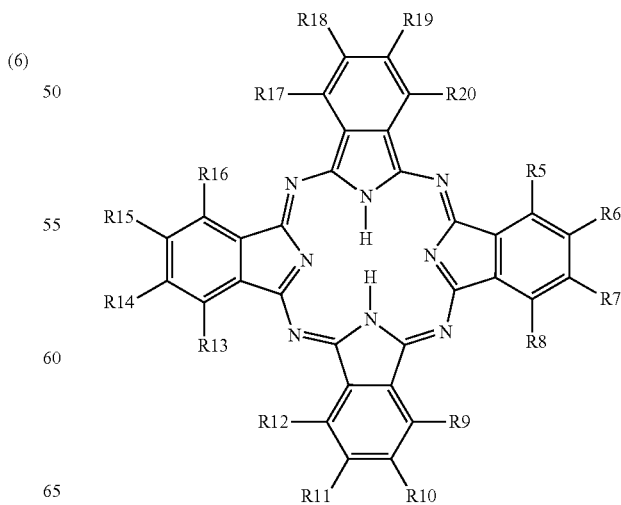
(8a)

(8b)

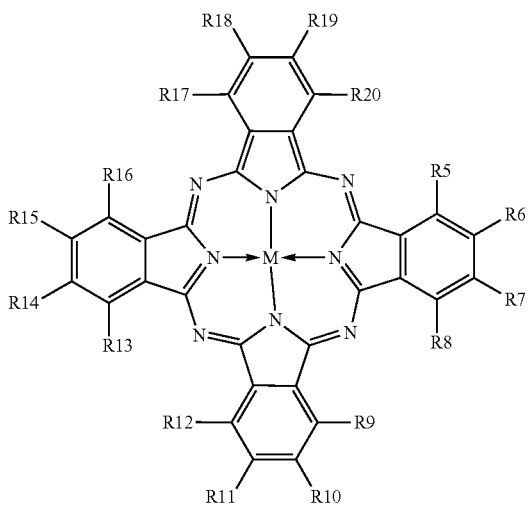

The radicals R(5-20) are each independently of each other hydrogen, methyl, ethyl, propyl, isopropyl, butyl, isobutyl, tert-butyl, pentyl, neopentyl, hexyl, thexyl, fluorine, chlorine, bromine, sulfone, CN.

Preferably, R(5-20) is the same in all positions. More preferably, R(5-20) is H in all positions. In an alternative embodiment, R(5-20) is Cl in all positions.

M is preferably aluminium (where R=H: aluminium phthalocyanine, CAS: 14154-42-8). nickel (where R=H: nickel phthalocyanine, CAS: 14055-02-8), cobalt (where R=H: cobalt phthalocyanine, CAS: 3317-67-7), iron (where R=H: iron phthalocyanine, CAS: 132-16-1), zinc (where R=H: zinc phthalocyanine, CAS: 14320-04-08), copper (where R=H: copper phthalocyanine, CAS: 147-14-8; where R=H and Cl: polychloro-copper phthalocyanine, CAS: 1328-53-6; where R=Cl: hexadecachlorophthalocyanine, CAS: 28888-81-5; where R=Br: hexadecabromophthalocyanine, CAS: 28746-04-5), manganese (where R=H: manganese phthalocyanine, CAS: 14325-24-7).

The combination of M=Cu and R=H for all positions is particularly preferred. A compound of the structure (8b) where M=Cu and R(5-20)=H is thus obtainable from BASF AG Ludwigshafen as Heliogen® Blue K 6911D or Heliogen® Blue K 7104 KW.

Compounds of the structure (8a) are obtainable e.g. from BASF AG, Ludwigshafen as Heliogen® Blue L 7460.

Of the structures (4), (6), (7) and (8a) or (8b), the use of the structures (4), (7) and (8b) is particularly preferred, it being possible, as described above, for the structure (4) to be replaced by structure (5) under the prerequisites described. The use of colouring agents of the structure (7) is very particularly preferred. In a specific embodiment of the present invention, with respect to the organic colouring agents according to the invention the sole use of colouring agents of the structure (7) is particularly preferred, A particularly preferred group of colouring agent combinations contains no colouring agents of the structure (3).

While in an alternative embodiment colouring agent combinations with at least in each case one colouring agent from the groups a) and b) are preferably employed, in deviation from this colouring agent combinations according to XXI and XXII can be used in a particular embodiment.

In this context, the explicit colouring agent structures mentioned as preferred among the components a) and b) are correspondingly preferably employed in these particularly suitable colouring agent combinations.

In a furthermore preferred embodiment, the colouring agents of the structures 1-3 are present in a ratio to the colouring agents of the structures 4-8 of from 1:3 to 3:1, preferably in a ratio of from 1:2 to 2:1.

The organic colouring agents disclosed as components a) and b) in the context of the present invention can be used in thermoplastic polymer compositions in amounts, based on the particular individual component, of from 0.000001 wt. % to 1.000000 wt. %, preferably from 0.00005 wt. % to 0.50000 wt. % and particularly preferably from 0.0001 wt. % to 0.1000 wt. %.

In a specific embodiment for transparently coloured thermoplastic polymer compositions, the organic colouring agents according to the invention are used in the thermoplastic polymer compositions in amounts, based on the particular individual component, of from 0.00001 wt. % to 0.30000 wt. %, preferably from 0.00005 wt. % to 0.10000 wt. % and particularly preferably from 0.00010 wt. % to 0.05000 wt. %.

The amounts stated in wt. % relate here to a resulting polymer composition containing the organic colouring agents or organic colouring agent combinations according to the invention.

In a preferred embodiment, the colouring agent compositions according to the invention comprise only compounds of the abovementioned structures 1-8.

The thermoplastic polymer compositions according to the invention containing the organic colouring agents or organic colouring agent combinations according to the invention are based here on the polymer component c).

The polymer component c) contains:
a thermoplastic, preferably transparent thermoplastic, preferably polycarbonate, copolycarbonate, polyester carbonate, polystyrene, styrene copolymers, aromatic polyester, such as polyethylene terephthalate (PET), PET/cyclohexanedimethanol copolymer (PETG), polyethylene naphthalate (PEN), polybutylene terephthalate (PBT), cyclic polyolefin, poly- or copolyacrylates and poly- or copolymethacrylate, such as e.g. poly or copolymethyl methacrylates (such as PMMA) and copolymers with styrene, such as e.g. transparent polystyrene/acrylonitrile (PSAN), thermoplastic polyurethanes, polymers based on cyclic olefins (e.g. TOPAS®, a commercial product from Ticona), more preferably polycarbonate, copolycarbonate, polyester carbonate, aromatic polyester or polymethyl methacrylate, or mixtures of the components mentioned, and particularly preferably polycarbonate and copolycarbonate, the transparent thermoplastic being added in an amount such that this gives 100 wt. % with all the other components.

Mixtures of several transparent thermoplastic polymers are also possible, especially if they are miscible with one another to give transparent mixtures, a mixture of polycarbonate with PMMA (more preferably with PMMA<2 wt. %) or polyester being preferred in a specific embodiment.

A further specific embodiment contains in this connection a mixture of polycarbonate and PMMA with less than 2.0%, preferably less than 1.0%, more preferably less than 0.5%, wherein it contains at least 0.01% of PMMA, based on the amount of polycarbonate, the PMMA preferably having a molecular weight of <40,000 g/mol. In a particularly preferred embodiment, the content of PMMA is 0.2% and particularly preferably 0.1%, based on the amount of polycarbonate, the PMMA preferably having a molecular weight of <40,000 g/mol.

An alternative further specific embodiment contains a mixture of PMMA and polycarbonate with less than 2%, preferably less than 1%, more preferably less than 0.5%, still more preferably with 0.2% and particularly preferably 0.1% of polycarbonate, based on the amount of PMMA.

Suitable polycarbonates for the preparation of the plastics composition according to the invention are all the known polycarbonates. These are homopolycarbonates, copolycarbonates and thermoplastic polyester carbonates.

The suitable polycarbonates preferably have average molecular weights $\overline{M}_w$ of from 10,000 to 50,000, preferably from 14,000 to 40,000 and in particular from 16,000 to 32,000, determined by gel permeation chromatography with polycarbonate calibration. The preparation of the polycarbonates is preferably carried out by the interfacial process or the melt transesterification process, which are described in many instances in the literature.

For the interfacial process, reference may be made by way of example to H. Schnell, "Chemistry and Physics of Polycarbonates, Polymer Reviews, vol. 9, Interscience Publishers, New York 1964 p. 33 et seq., to Polymer Reviews, vol. 10, "Condensation Polymers by Interfacial and Solution Methods", Paul W. Morgan, Interscience Publishers, New York 1965, chap. VIII, p. 325, to Dres. U. Grigo, K. Kircher and P. R. Müller "Polycarbonate" in Becker/Braun, Kunststoff-Handbuch, volume 3/1, Polycarbonate, Polyacetale, Polyester, Celluloseester, Carl Hanser Verlag Munich, Vienna 1992, p. 118-145 and to EP 0 517 044 A1.

The melt transesterification process is described, for example, in the Encyclopedia of Polymer Science, vol. 10 (1969), Chemistry and Physics of Polycarbonates, Polymer Reviews, H. Schnell, vol. 9, John Wiley and Sons, Inc. (1964) and in the patent specifications DE-B 10 31 512 and U.S. Pat. No. 6,228,973.

The polycarbonates are preferably prepared by reactions of bisphenol compounds with carbonic acid compounds, in particular phosgene, or, in the melt transesterification process, diphenyl carbonate or dimethyl carbonate.

Homopolycarbonates based on bisphenol A and copolycarbonates based on the monomers bisphenol A and 1,1-bis-(4-hydroxyphenyl)-3,3,5-trimethylcyclohexane are particularly preferred here.

These and further bisphenol or diol compounds which can be employed for the polycarbonate synthesis are disclosed inter alia in WO 2008037364 A1 (p. 7, l. 21 to p. 10, l. 5), EP 1 582 549 A1 ([0018] to [0034]), WO 2002026862 A1 (p. 2, l. 20 to p. 5, l. 14), WO 2005113639 A1 (p. 2, l. 1 to p. 7, l. 20).

The polycarbonates can be linear or branched. Mixtures of branched and unbranched polycarbonates can also be employed.

Suitable branching agents for polycarbonates are known from the literature and are described, for example, in the patent specifications U.S. Pat. No. 4,185,009 and DE 25 00 092 A1 (3,3-bis-(4-hydroxyaryl)-oxindoles according to the invention, see in each case the entire document), DE 42 40 313 A1 (see p. 3, l. 33 to 55), DE 19 943 642 A1 (see p. 5, l. 25 to 34) and U.S. Pat. No. 5,367,044 and in the literature cited herein.

The polycarbonates used can moreover also be intrinsically branched, no branching agent being added here in the context of the polycarbonate preparation. An example for intrinsic branchings are so-called Fries structures, such as are disclosed for melt polycarbonates in EP 1 506 249 A1.

Chain terminators can furthermore be employed in the polycarbonate preparation. Phenols, such as phenol, alkylphenols, such as cresol and 4-tert-butylphenol, chlorophenol, bromophenol, cumylphenol or mixtures thereof, are preferably used as chain terminators.

The thermoplastic polymer compositions according to the invention based on the polymer component c) can optionally also contain further components here, in addition to the organic colouring agents or organic colouring agent combinations according to the invention of components a) and b). These include:

d) optionally 0.000 wt. % to 0.015 wt. %, preferably 0.00150 wt. % to 0.01500 wt. %, more preferably 0.00180 wt. % to 0.01100 wt. % and particularly preferably 0.00200 wt. % to 0.00900 wt. % of at least one organic or inorganic IR absorber, calculated as the solids content of IR absorber in the total polymer composition. In a specific embodiment, the IR absorbers are employed in an amount of from preferably 0.00350 wt. % to 0.00850 wt. % and particularly preferably 0.00400 to 0.00800 wt. %, calculated as the solids content of IR absorber in the total polymer composition. In this connection, solids content of IR absorber means the IR absorber as the pure substance and not a suspension or other formulation containing the pure substance.

Suitable IR absorbers are disclosed, for example, in EP 1 559 743 A1, EP 1 865 027 A1, DE 10022037 A1, DE 10006208 A1 and in the Italian patent applications RM2010A000225, RM2010A000227 and RM2010A000228.

Of the IR absorbers mentioned in the literature cited, those based on boride and tungstate and ITO- and ATO-based absorbers and combinations thereof are preferred.

e) optionally 0.00 wt. % to 20.00 wt. %, preferably from 0.05 wt. % to 10.00 wt. %, more preferably from 0.10 wt. % to 1.00 wt. %, still more preferably 0.10 wt. % to 0.50 wt. % and very particularly preferably 0.10 wt. % to 0.30 wt. % of at least one UV absorber.

Suitable UV absorbers are described, for example, in EP 1 308 084 A1, in DE 102007011069 A1 and in DE 10311063 A1.

f) optionally 0.0 wt. % to 5.0 wt. %, preferably 0.01 wt. % to 1.00 wt. % of at least one further additive. The further additives are conventional polymer additives, such as e.g. the flameproofing agents, optical brighteners, flow improvers, heat stabilizers, inorganic pigments, mould release agents or processing auxiliaries described in EP-A 0 839 623, WO-A 96/15102, EP-A 0 500 496 or "Plastics Additives Handbook", Hans Zweifel, 5th edition 2000, Hanser Verlag, Munich. In this connection, the substances already disclosed as components a), b), d) and e) of the present invention are expressly not a constituent of component f).

The polymer composition optionally contains an inorganic pigment, preferably carbon black. The carbon black is preferably present in the organic polymer matrix in finely dispersed form, and is preferably nanoscale. Suitable carbon blacks have an average particle size of preferably less than 100 nanometers (nm), more preferably less than 75 nm, still more preferably less than 50 nm and particularly preferably less than 40 nm, the average particle size preferably being greater than 0.5 nm, more preferably greater than 1 nm and particularly preferably greater than 5 nm. The particle size is determined by TEM (transmission electron microscopy).

g) optionally 0 wt. % to 50 wt. %, preferably 0 wt. % to 35 wt. %, more preferably 0 wt. % to 30 wt. %, particularly preferably 10 wt. % to 30 wt. % of fillers and reinforcing substances.

Fillers and reinforcing substances for polymer compositions are described, for example, in EP 1 624 012 A1, DE 3742881 A1, U.S. Pat. No. 6,860,539 B2, US 20060105053 A1, DE 102006055479 A1, WO 2005030851 A1 and in WO 2008122359 A1.

The amounts stated above in each case relate to the total polymer composition.

The coloured thermoplastic polymer compositions according to the invention contain at least one colouring agent or one colouring agent combination of the colouring agents and combinations disclosed under I to XXVI.

Preferably, the coloured thermoplastic polymer compositions according to the invention contain a combination of organic colouring agents according to the invention, wherein the organic colouring agent combinations according to the invention comprise at least one colouring agent chosen from the structures given for component a) and at least one colouring agent chosen from the structures given for component b).

More preferably, the colouring agent combinations which have already emerged as particularly suitable in the context of the present disclosure are explicitly used in the coloured thermoplastic polymer compositions according to the invention. In this context, the explicit colouring agent structures mentioned as preferred among the components a) and b) are correspondingly preferably employed in these particularly suitable colouring agent combinations.

The composition must be processable under the conventional temperatures for thermoplastics, i.e. at temperatures above 300° C., such as e.g. 350° C., without the colour or the performance data changing significantly during processing.

The preparation of the polymer compositions according to the invention containing the components a) to g) is carried out with the usual processes of incorporation by bringing together, mixing and homogenizing, the homogenizing in particular preferably taking place in the melt under the action of shearing forces. The bringing together and mixing are optionally carried out before the melt homogenization, using powder premixes.

Premixes which have been prepared from solutions of the mixing components in suitable solvents, homogenization optionally being carried out in solution and the solvent then being removed, can also be used.

In particular, the components of the composition according to the invention can be introduced here by known processes, such as, inter alia, as a masterbatch.

The use of masterbatches and of powder mixtures or compacted premixes is suitable in particular for introduction of the components a), b), e) and f). All the abovementioned components can optionally be premixed here. Alternatively, however, premixes of a) and b) or of a), b) and d) and any desired other combinations are also possible. In all cases, for better ease of metering in the preparation of the thermoplastic polymer compositions, the abovementioned component premixes are preferably topped up with pulverulent polymer component c) such that total volumes which are easy to handle arise.

In a particular embodiment, the abovementioned components can be mixed to form a masterbatch, the mixing preferably taking place in the melt under the action of shearing forces (for example in a kneader or twin-screw extruder). This process offers the advantage that the components are distributed better in the polymer matrix. For preparation of the masterbatch, the thermoplastic which is also the main component of the final total polymer composition is preferably chosen as the polymer matrix.

In this connection, the composition can be brought together, mixed, homogenized and then extruded in conventional devices, such as screw extruders (for example twin-screw extruders, TSE), kneaders or Brabender or Banbury mills. After the extrusion, the extrudate can be cooled and comminuted. Individual components can also be premixed and the remaining starting substances can then be added individually and/or likewise as a mixture.

The polymer compositions according to the invention can be processed to products or shaped articles for example by first extruding the polymer compositions to granules, as described, and processing these granules to various products or shaped articles by suitable processes in a known manner.

In this connection, the compositions according to the invention can be converted into products, shaped articles or shaped objects, for example, by hot pressing, spinning, blow moulding, thermoforming, extrusion or injection moulding. The use of multi-layer systems is also of interest. The application can be effected at the same time as or immediately after the shaping of the base body, e.g. by coextrusion or multi-component injection moulding. However, the application can also be effected on the ready-formed base body, e.g. by lamination with a film or by coating with a solution.

Sheets or shaped articles of a base and optional top layer/optional top layers (multilayer systems) can be produced by (co)extrusion, direct skinning, direct coating, insert moulding, back-injection moulding of films or other suitable processes known to the person skilled in the art.

Injection moulding processes are known to the person skilled in the art and are described, for example, in "Handbuch Spritzgiessen", Friedrich Johannnaber/Walter Michaeli, Munich; Vienna: Hanser, 2001, ISBN 3-446-15632-1 or "Anleitung zum Bau von Spritzgiesswerkzeugen", Menges/Michaeli/Mohren, Munich; Vienna: Hanser, 1999, ISBN 3-446-21258-2.

Extrusion processes are known to the person skilled in the art and are described, for example for coextrusion, inter alia in EP-A 0 110 221, EP-A 0 110 238 and EP-A 0 716 919. For details of the adapter and die process see Johannaber/Ast: "Kunststoff-Maschinenführer", Hanser Verlag, 2000 and in Gesellschaft Kunststofftechnik: "Coextrudierte Folien und Platten: Zukunftsperspektiven, Anforderungen, Anlagen und Herstellung, Qualitätssicherung", VDI-Verlag, 1990.

Products, shaped articles or shaped objects which are preferred according to the invention are glazing, for example automobile windows, windows of track vehicles and aircraft, automobile sunroofs, safety screens, roofing or building glazing, LEDs, lamp covers for the interior area of vehicles and buildings, lamp covers for outdoors, such as e.g. covers of streetlights, sighting devices, spectacles, extruded and solvent films for displays or electric motors, also ski foils, traffic light lenses, which contain the compositions according to the invention. In this context, in addition to solid sheets, twin-wall sheets or multi-wall sheets can also be used. As further components of the products according to the invention, in addition to the compositions according to the invention, the products according to the invention can contain, for example, further material parts.

In a particular embodiment, the articles produced from the composition of the present invention are coated. This coating serves to protect the thermoplastic material from general weathering influences (e.g. damage by sunlight) and from mechanical impairment of the surface (e.g. scratching) and thus increases the resistance of the correspondingly treated articles.

It is known that polycarbonate can be protected from UV radiation by means of various coatings. These coatings conventionally contain UV absorbers. These layers likewise increase the scratch resistance of the corresponding article. The articles from the present invention can carry one layer or multi-layer systems. They can be coated on one or both sides. In a preferred embodiment, the article contains a scratch-resistant lacquer containing UV absorbers. In a particular embodiment, the multi-layer product comprises at least one layer containing the composition according to the invention, at least one UV protective layer and optionally a scratch-resistant coating.

In the case of glazing materials, the article carries at least one scratch-resistant and/or antireflex coating on at least one side.

EXAMPLES

The invention is described in more detail with the aid of embodiment examples in the following, the determination methods described here being used for all the corresponding parameters in the present invention if nothing to the contrary had been described.

Melt Volume Rate:

The melt volume rate (MVR) is determined in accordance with ISO 1133 (at 300° C.; 1.2 kg).

The colour in transmission is determined with a Lambda 900 spectrophotometer from Perkin Elmer with a photometer sphere in accordance with ASTM E1348 with the weighting factors and formulae described in ASTM E308.

The CIELAB colour coordinates L*, a*, b* are calculated for light type D 65 and 10° normal observer.

Light Transmission (Ty):

The transmission measurements were performed on a Lambda 900 spectrophotometer from Perkin Elmer with a photometer sphere in accordance with ISO 13468-2 (i.e. determination of the total transmission by measurement of the diffuse transmission and direct transmission).

Colour Change:

ΔE is a calculated value for the colour difference detected in accordance with ASTM D 2244. In the present experiments, light type D 65/10° was used. Formula 7 in ASTM D 2244 was used for calculation of the ΔE value.

Weathering:

The artificial weathering with exposure to xenon light is carried out in accordance with the standard ASTM G 155 in a xenon CI 5000 weatherometer from Atlas on coloured sample sheets (see production of the test specimens). Two borosilicate filters were used as UV filters. The incident radiation intensity is 0.75 W/m$^2$/mn at 340 nm. The black standard temperature is 80° C., the sample room temperature 40° C. The samples are irrigated for 18 min every 120 min, the exposure to light also remaining switched on during the irrigation phase. The abovementioned weathering method is called Xe-Wom 0.75W in the following.

Visual Colour Impression:

The visual colour impression is determined with the naked eye with the aid of coloured sample sheets (see production of the test specimens). For this, the coloured sample sheets were viewed in daylight against a white background and classified accordingly (for the classification see the table Test specimens and measurement results).

Clouding:

The clouding was determined in accordance with ASTM D 1003 with a BYK Gardner Haze Gard.

Materials for Production of the Test Specimens:

Component a)

The product from A (all R=H, see below) is used as the colouring agent of the formula (1a, 1b).

The product from B (all R=H, see below) is used as the colouring agent of the formula (2a, 2b).

Macrolex Violet B (Solvent Violet 13, CAS No. 81-48-1) from Lanxess AG, Leverkusen is used as the colouring agent of the formula (3).

Component b)

Macrolex Red EG (Solvent Red 135, CAS No. 20749-68-2) from Lanxess AG, Leverkusen is used as the colouring agent of the structure (4).

Paliogen Blue 6385 (Pigment Blue 60, CAS No. 81-77-6) from BASF SE, 67065 Ludwigshafen, Germany is used as the colouring agent of the structure (7). This colouring agent has a bulk volume of 7 l/kg, a pH of 6-9 and a specific surface area of 40 m$^2$/g.

Heliogen Blue K 6911 D (CAS No. 147-14-8) from BASF SE, 67065 Ludwigshafen, Germany is used as the colouring agent of the structure (8b).

Component c)

Linear bisphenol A polycarbonate with end groups based on phenol with a melt volume rate (MVR) of 6 cm$^3$/10 min (measured at 300° C. under a 1.2 kg load in accordance with ISO 1033), called PC 1 in the following.

Linear bisphenol A polycarbonate with end groups based on phenol with an MVR of 12.5 cm$^3$/10 min (measured at 300° C. under a 1.2 kg load in accordance with ISO 1033), called PC 2 in the following.

PC 2 also contains an additive mixture comprising mould release agent, heat stabilizer and UV stabilizer. Pentaerythritol tetrastearate (CAS 115-83-3) is employed as the mould release agent, triphenylphosphine (CAS 603-35-0) is employed as the heat stabilizer and Tinuvin® 329 (CAS 3147-75-9) is employed as the UV stabilizer.

Component d)

Lanthanum hexaboride, LaB$_6$ (KHDS 06 from Sumitomo Metal Mining, Japan, CAS No. 857255-66-4). The product is in the form of a pulverulent dispersion. The weights stated in the examples relate to the product KHDS 06, the solids content of lanthanum hexaboride in the commercial KHDS 06 dispersion employed being 21.5 wt. %.

Lanthanum hexaboride, LaB$_6$ (KHDS 872G2 from Sumitomo Metal Mining, Japan, CAS No. 949005-03-2). The product is in the form of a pulverulent dispersion. The weights stated in the examples relate to the product KHDS 872G2, the solids content of lanthanum hexaboride in the commercial KHDS 872G2 dispersion employed being 10.0 wt. %.

Lumogen IR 765 (a quaterrylene, CAS No. 943969-69-5) from BASF SE, 67065 Ludwigshafen, Germany.

A pulverulent dispersion (FMDS 874 from Sumitomo Metal Mining, Japan, polyacrylate dispersion, CAS No. 953384-75-3) was employed as an IR absorber based on ATO, the solids content of SnO$_2$:Sb in the dispersion being 25 wt. %.

Component f)

Black Pearls® 800 (CAS No. 1333-86-4) from Cabot Corp. are employed as nanoscale carbon black (particle size approx. 17 nm).

Colouring Agents for Comparison Examples

Macrolex Blue RR (Colour Index: Solvent Blue 97; CAS No.: 32724-62-2) from Lanxess Deutschland GmbH is employed as a further colouring agent which is not according to the invention.

Macrolex Violet 3R Gran. (Colour index: Solvent Violet 36; CAS No.: 61951-89-1) from Lanxess Deutschland GmbH is employed as a further colouring agent which is not according to the invention.

Preparation of the Thermoplastic Polymer Compositions by Compounding:

The compounding of the additives was carried out on a twin-screw extruder from KraussMaffei Berstorff, type ZE25 at a housing temperature of 260° C. and a melt temperature of 270° C. at a speed of rotation of 100 rpm at a throughput of 10 kg/h with the amounts of components stated in the examples. For better mixing, a powder mixture of PC 1 (10 wt. % of powder mixture, based on the total composition) containing the further components stated below is first prepared here. This powder mixture is metered into PC 2 during the compounding.

Production of the Test Specimens:

The granules are dried in vacuo at 120° C. for 3 hours and then processed on an injection moulding machine of the Arburg 370 type with a 25 injection unit at a melt temperature of 300° C. and a mould temperature of 90° C. to give coloured sample sheets with the dimensions 60 mm×40 mm×Z mm; Z here is 3.2 mm, 4.0 mm or 5.0 mm.

Preparation of the Substances of Component a)

Inter alia, structures of the formula (1a), (1b), (2a) and (2b) were employed in the examples according to the invention. The preparation of these dyestuffs was carried out in accordance with DE 2148101 as follows:

Preparation of a 1:1 Mixture (wt. %) of (1a) and (1b):

5.62 g (0.025 mol) of benzene-1,2,4,5-tetracarboxylic acid dianhydride and 7.99 g (0.05 mol) of 1,8-diaminonaphthalene are initially introduced into 75 ml of M-ethylpyrrolidone at room temperature and the mixture is heated slowly to 150° C. It is stirred at this temperature for 5 hours. After cooling, 125 ml of water are added and the precipitate which has precipitated out is filtered off. The precipitate is suspended in water several more times and washed in this manner. The precipitate is dried at 80° C. under a high vacuum. A mixture of 50 ml of glacial acetic acid and 25 ml of acetic anhydride is added to the dried precipitate. The mixture is boiled under reflux for 4 hours. After cooling, the reaction mixture is added to 500 ml of water. The precipitate is filtered off, washed with water and dried at 80° C. under a high vacuum. 12.5 g of a lilac-coloured powder are obtained.

B. Preparation of a 1:1 Mixture (wt. %) of (2a) and (2b):

6.71 g (0.025 mol) of naphthalene-1,4,5,8-tetracarboxylic acid dianhydride and 7.99 g (0.05 mol) of 1,8-diaminonaphthalene are initially introduced into 75 ml of M-ethylpyrrolidone at room temperature and the mixture is heated slowly to 150° C. It is stirred at this temperature for 5 hours. After cooling, 152 ml of water are added and the precipitate which has precipitated out is filtered off. The precipitate is suspended in water several more times and washed in this manner. The precipitate is dried at 80° C. under a high vacuum. A mixture of 50 ml of glacial acetic acid and 25 ml of acetic anhydride is added to the dried precipitate. The mixture is boiled under reflux for 4 hours. After cooling, the reaction mixture is added to 125 ml of water. The precipitate is filtered off, washed with hot water and dried at 80° C. under a high vacuum. 13.7 g of a lilac-coloured powder are obtained.

Lacquering of the Test Specimens:

The product SHP470FT (Momentive Performance Materials Inc. Wilton, Conn. USA) is used as the primer. The product AS 4700 (Momentive Performance Materials Inc. Wilton, Conn. USA) is used as the protective lacquer.

The coating was carried out in a climatically controlled coating room under the particular instructions of the lacquer manufacturer at 23 to 25° C. and 40 to 48% rel. humidity.

The test specimens were cleaned with so-called iso-cloths (LymSat® from LymTech Scientific; saturated with 70% isopropanol and 30% deionized water), rinsed with isopropanol, dried in air for 30 min and blasted with ionized air.

The test specimens are coated by hand by the flooding process. In this case, the primer solution is poured over the sheet in the longitudinal direction starting from the upper edge of the small part, while at the same time the starting point of the primer on the sheet is guided from left to right over the sheet width. The primed sheet was dried in air until dust dry and cured in a circulating air oven according to the particular manufacturer's instructions, while suspended vertically on a clamp (dried in air at room temperature for 30 minutes and cured at 125° C. for 30 minutes). After cooling to room temperature, coating of the primed surface with AS 4700 was carried out. After the drying in air until dust dry, curing was carried out at 130° C. in a circulating air oven for 60 min.

The primer layer thickness and the thickness of the topcoat can influence the weathering properties.

In order to achieve a sufficient and comparable protective action against weathering, the primer layer thickness for the following examples should be in the range of 1.2-4.0 μm and the thickness of the topcoat should be between 4.0 and 8.0 μm. In the following table of results, the primer layer thickness is stated before the forward slash and the thickness of the topcoat is stated after the forward slash in the topcoat column.

Example 1

Comparison Example

A polymer composition containing the amounts of the following components is prepared by compounding as described above.

| | |
|---|---|
| Macrolex Red EG (component b)): | 0.00313 wt. % |
| Macrolex Blue RR (colouring agent for comparison examples): | 0.00320 wt. % |
| Lumogen IR 765 (component d)): | 0.00180 wt. % |
| KHDS 06 (component d)): | 0.01350 wt. % |
| BlackPearls 800 (component f)): | 0.00144 wt. % |
| PC 1 (component c)): | 9.97693 wt. % |
| PC 2 (component c)): | 90.00000 wt. % |

PC 2 here contains the additives listed above under PC 2. PC 2 here contains 0.270 wt. % of mould release agent, 0.025 wt. % of heat stabilizer and 0.200 wt. % of UV stabilizer, in each case based on the amount of PC 2 employed.

Example 2

Comparison Example

A polymer composition containing the amounts of the following components is prepared as described above:

| | |
|---|---|
| Macrolex Red EG (component b)): | 0.00335 wt. % |
| Macrolex Blue RR (colouring agent for comparsion examples): | 0.00315 wt. % |
| Lumogen IR 765 (component d)): | 0.00140 wt. % |
| KHDS 872G2 (component d)): | 0.06000 wt. % |
| BlackPearls 800 (component f)): | 0.00128 wt. % |
| PC 1 (component c)): | 9.93082 wt. % |
| PC 2 (component c)): | 90.00000 wt. % |

PC 2 here contains the additives listed above under PC 2. PC 2 here contains 0.270 wt. % of mould release agent, 0.025 wt. % of heat stabilizer and 0.200 wt. % of UV stabilizer, in each case based on the amount of PC 2 employed.

Example 3

Comparison Example

A polymer composition containing the amounts of the following components is prepared as described above:

| | |
|---|---|
| Macrolex Red EG (component b)): | 0.002450 wt. % |
| Macrolex Blue RR (colouring agent for comparison examples): | 0.003090 wt. % |

-continued

| | |
|---|---|
| Heliogen Blue K6911D (component b)): | 0.000095 wt. % |
| KHDS 872G2 (component d)): | 0.057000 wt. % |
| BlackPearls 800 (component f)): | 0.001410 wt. % |
| PC 1 (component c)): | 9.935955 wt. % |
| PC 2 (component c)): | 90.000000 wt. % |

PC 2 here contains the additives listed above under PC 2. PC 2 here contains 0.270 wt. % of mould release agent, 0.025 wt. % of heat stabilizer and 0.200 wt. % of UV stabilizer, in each case based on the amount of PC 2 employed.

Example 4

Comparison Example

A polymer composition containing the amounts of the following components is prepared as described above:

| | |
|---|---|
| Macrolex Red EG (component b)): | 0.00550 wt. % |
| Macrolex Blue RR (colouring agent for comparison examples): | 0.00392 wt. % |
| Heliogen Blue K6911D (component b)): | 0.00133 wt. % |
| KHDS 06 (component d)): | 0.03130 wt. % |
| BlackPearls 800 (component f)): | 0.00167 wt. % |
| PC 1 (component c)): | 9.95628 wt. % |
| PC 2 (component c)): | 90.00000 wt. % |

PC 2 here contains the additives listed above under PC 2. PC 2 here contains 0.270 wt. % of mould release agent, 0.025 wt. % of heat stabilizer and 0.200 wt. % of UV stabilizer, in each case based on the amount of PC 2 employed.

Example 5

Comparison Example

A polymer composition containing the amounts of the following components is prepared as described above:

| | |
|---|---|
| Macrolex Red EG (component b)): | 0.00370 wt. % |
| Macrolex Violet 3R Gran (colouring agent for comparison examples): | 0.00240 wt. % |
| Heliogen Blue K6911D (component b)): | 0.00230 wt. % |
| KHDS 06 (component d)): | 0.03000 wt. % |
| BlackPearls 800 (component f)): | 0.00065 wt. % |
| PC 1 (component c)): | 9.96095 wt. % |
| PC 2 (component c)): | 90.00000 wt. % |

PC 2 here contains the additives listed above under PC 2. PC 2 here contains 0.270 wt. % of mould release agent, 0.025 wt. % of heat stabilizer and 0.200 wt. % of UV stabilizer, in each case based on the amount of PC 2 employed.

Example 6

Comparison Example

A polymer composition containing the amounts of the following components is prepared as described above:

| | |
|---|---|
| Macrolex Red EG (component b)): | 0.00470 wt. % |
| Macrolex Violet 3R Gran (colouring agent for comparison examples): | 0.00117 wt. % |

-continued

| | |
|---|---|
| Heliogen Blue K6911D (component b)): | 0.00262 wt. % |
| YMDS 874 (component d)): | 0.10000 wt. % |
| BlackPearls 800 (component f)): | 0.00188 wt. % |
| PC 1 (component c)): | 9.88963 wt. % |
| PC 2 (component c)): | 90.00000 wt. % |

PC 2 here contains the additives listed above under PC 2. PC 2 here contains 0.270 wt. % of mould release agent, 0.025 wt. % of heat stabilizer and 0.200 wt. % of UV stabilizer, in each case based on the amount of PC 2 employed.

Example 7

According to the Invention

A polymer composition containing the amounts of the following components is prepared as described above:

| | |
|---|---|
| Paliogen Blue L6385 (component b)): | 0.00210 wt. % |
| A. 1:1 mixture (wt. %) of (1a) and (1b) (component a)): | 0.00147 wt. % |
| KHDS 872G2 (component d)): | 0.07500 wt. % |
| BlackPearls 800 (component f)): | 0.00165 wt. % |
| PC 1 (component c)): | 9.91978 wt. % |
| PC 2 (component c)): | 90.00000 wt. % |

PC 2 here contains the additives listed above under PC 2. PC 2 here contains 0.270 wt. % of mould release agent, 0.025 wt. % of heat stabilizer and 0.200 wt. % of UV stabilizer, in each case based on the amount of PC 2 employed.

Example 8

According to the Invention

A polymer composition containing the amounts of the following components is prepared as described above:

| | |
|---|---|
| Paliogen Blue L6385 (component b)): | 0.00278 wt. % |
| 1:1 mixture (wt. %) of (1a) and (1b) (component a)): | 0.00236 wt. % |
| KHDS 872G2 (component d)): | 0.07000 wt. % |
| BlackPearls 800 (component f)): | 0.00220 wt. % |
| PC 1 (component c)): | 9.92266 wt. % |
| PC 2 (component c)): | 90.00000 wt. % |

PC 2 here contains the additives listed above under PC 2. PC 2 here contains 0.270 wt. % of mould release agent, 0.025 wt. % of heat stabilizer and 0.200 wt. % of UV stabilizer, in each case based on the amount of PC 2 employed.

Example 9

According to the Invention

A polymer composition containing the amounts of the following components is prepared as described above:

| | |
|---|---|
| Paliogen Blue L6385 (component b)): | 0.00211 wt. % |
| 1:1 mixture (wt. %) of (1a) and (1b) (component a)): | 0.00248 wt. % |
| KHDS 872G2 (component d)): | 0.09000 wt. % |
| FMDS 874 (component d)): | 0.12552 wt. % |

-continued

| | |
|---|---|
| BlackPearls 800 (component f)): | 0.00139 wt. % |
| PC 1 (component c)): | 9.77850 wt. % |
| PC 2 (component c)): | 90.00000 wt. % |

PC 2 here contains the additives listed above under PC 2. PC 2 here contains 0.270 wt. % of mould release agent, 0.025 wt. % of heat stabilizer and 0.200 wt. % of UV stabilizer, in each case based on the amount of PC 2 employed.

TABLE 1

Test specimens and measurement results

| Example | Thick-ness* [mm] | Primer/ Topcoat * [μm] | ΔE 1,000 h** | ΔE 2,000 h** | ΔE 3,000 h** | Visual colour impres-sion 3,000 h** | Visual colour impres-sion *** |
|---|---|---|---|---|---|---|---|
| 1 (comparison) | 5.0 | 2.2/5.1 | 1.89 | 3.41 | 4.76 | − | + |
| 2 (comparison) | 5.0 | 1.7/5.6 | 1.88 | 3.60 | 5.10 | − | + |
| 3 (comparison) | 5.0 | 1.4/5.4 | 1.85 | 3.69 | 5.11 | − | + |
| 4 (comparison) | 3.2 | 1.8/4.3 | 3.01 | 5.30 | 7.29 | −− | + |
| 5 (comparison) | 3.2 | 1.3/6.1 | 1.50 | 2.73 | 3.77 | ○ | + |
| 6 (comparison) | 4.0 | 2.8/4.2 | 1.44 | 2.64 | 3.71 | ○ | + |
| 7 (according to the invention) | 5.0 | 1.6/6.1 | 0.82 | 1.34 | 1.74 | + | + |
| 8 (according to the invention | 3.2 | 1.4/6.4 | 0.94 | 1.29 | 1.69 | + | + |
| 9 (according to the invention | 3.2 | 1.5/6.3 | 1.02 | 1.80 | 2.91 | + | + |

\* Data on the test specimen;
\*\* after weathering;
\*\*\* before weathering
+ pleasant;
○ adequate;
− poor;
−− very poor Overall, it is to be said that only the mixtures according to the invention have the required colour stability (ΔE).

The comparison examples show that the colouring agents cannot be combined as desired. Comparison Examples 1 to 6 indeed show a similar colour impression to the examples according to the invention. Nevertheless, these examples show a significant and undesirable colour shift after weathering. Even when the comparison examples in some cases contain colouring agents which are also used in the compositions according to the invention, these are not stable to weathering. It is thus found, surprisingly, that only the use of the colouring agent combinations according to the invention leads to the desired colour-stable polymer compositions.

It will be appreciated by those skilled in the art that changes could be made to the embodiments described above without departing from the broad inventive concept thereof It is understood, therefore, that this invention is not limited to the particular embodiments disclosed, but it is intended to cover modifications within the spirit and scope of the present invention as defined by the appended claims.

The invention claimed is:

1. A transparent thermoplastic polymer composition comprising or a colouring agent combination of the structures selected from the group consisting of:
    III. (1a) and (1b), (7)
    IV. (1a) and (1b), (4), (7)
    XII. (3), (4), (8b)
    XIII. (3), (5), (8b)
    XX. (1a) and (1b), (8b)
wherein the structures are as follows:

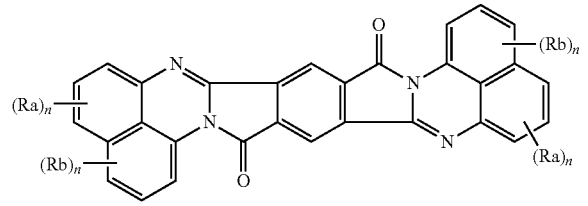

(1a)

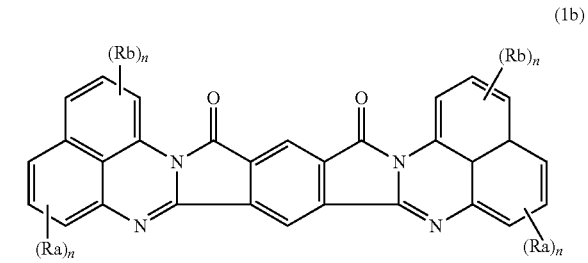

(1b)

wherein
Ra and Rb, independently of one another, represent a linear or branched alkyl radical, or halogen;
n, independently of the particular R, represents a natural number between 0 and 3, wherein for n=0 the radical is hydrogen;

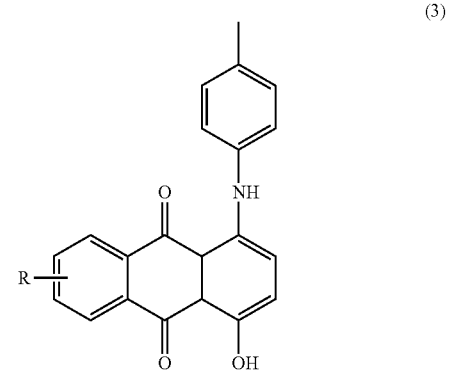

(3)

wherein
R is selected from the group consisting of H and the p-methylphenylamine radical;

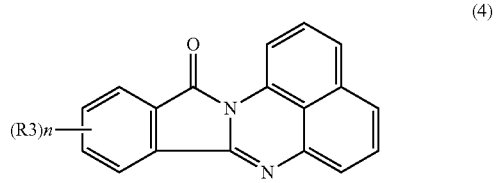

(4)

wherein
R3 is a halogen;
n=4;

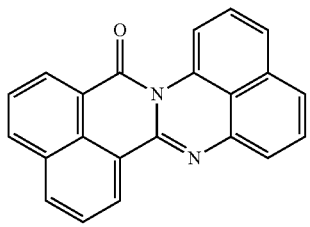
(5)

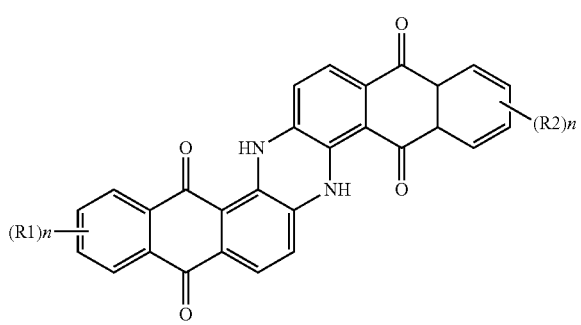
(7)

wherein
R1 and R2, independently of one another, represent a linear or branched alkyl radical, or halogen;
n represents a natural number between 0 and 4;

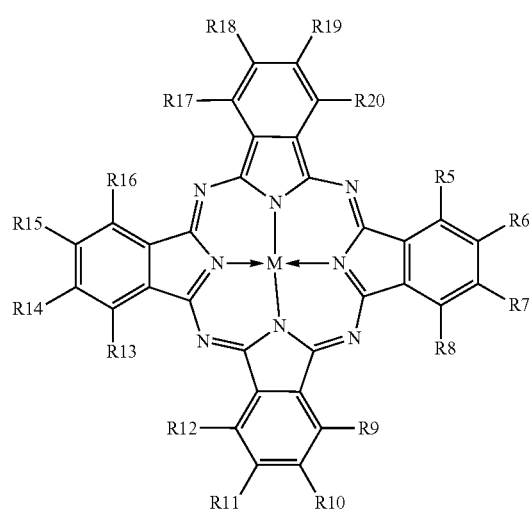
(8b)

wherein
the radicals R(5-20), independently of one another, represent hydrogen, methyl, ethyl, propyl, isopropyl, butyl, isobutyl, tert-butyl, pentyl, neopentyl, hexyl, thexyl, fluorine, chlorine, bromine, sulfone or CN, and M, represents aluminium, nickel, cobalt, iron, zinc, copper or manganese, and a polycarbonate polymer, wherein the colouring agent combination is used in amounts, based on the particular individual components, of from 0.000001 weight % to 1 weight %, based on the total polymer composition, and wherein the change in the colour value E after 1,000 h of artificial weathering with exposure to xenon light at 0.75 W is less than 1.02.

2. The composition according to claim 1, wherein the composition comprises at least one colouring agent of the structures (1a), (1b) or (7).

3. The composition according to claim 1, wherein the colouring agent of the structure (7) has a bulk volume of 2 l/kg to 10 l/kg, a specific surface area of 5 $m^2/g$ to 60 $m^2/g$ and a pH of from 4 to 9.

4. The composition according to claim 1, wherein the composition comprises the colouring agents of the structures (1a) and (1b) in a 1:1 isomer mixture.

5. The composition according to claim 1, wherein the composition comprises at least one colouring agent chosen from the structures 1a, 1b and 3 and at least one colouring agent chosen from the structures 4, 5, 6 to 8b.

6. The composition according to claim 5, wherein the colouring agents of structures 1a, 1b and 3 are present in a ratio to the colouring agents of structures 4, 5, 6 to 8b of from 1:3 to 3:1.

7. The thermoplastic polymer composition according to claim 1, wherein the composition further comprises inorganic or organic IR absorbers, UV absorbers and/or carbon black.

8. A process for preparing a weathering-stable, transparent, thermoplastic polymer composition which comprises using the thermoplastic polymer composition according to claim 1.

9. A vehicle pane comprising the thermoplastic polymer composition according to claim 1.

10. The vehicle pane according to claim 9, wherein the vehicle pane comprises a scratch-resistant coating which comprises UV absorbers.

11. The vehicle pane according to claim 9, wherein the vehicle pane has a change in the colour value E after 3,000 h of artificial weathering with exposure to xenon light at 0.75 W of less than 5.0.

* * * * *